Nov. 28, 1961  C. V. KENNEY  3,010,731
BABY STROLLER
Filed Oct. 14, 1959  2 Sheets-Sheet 1
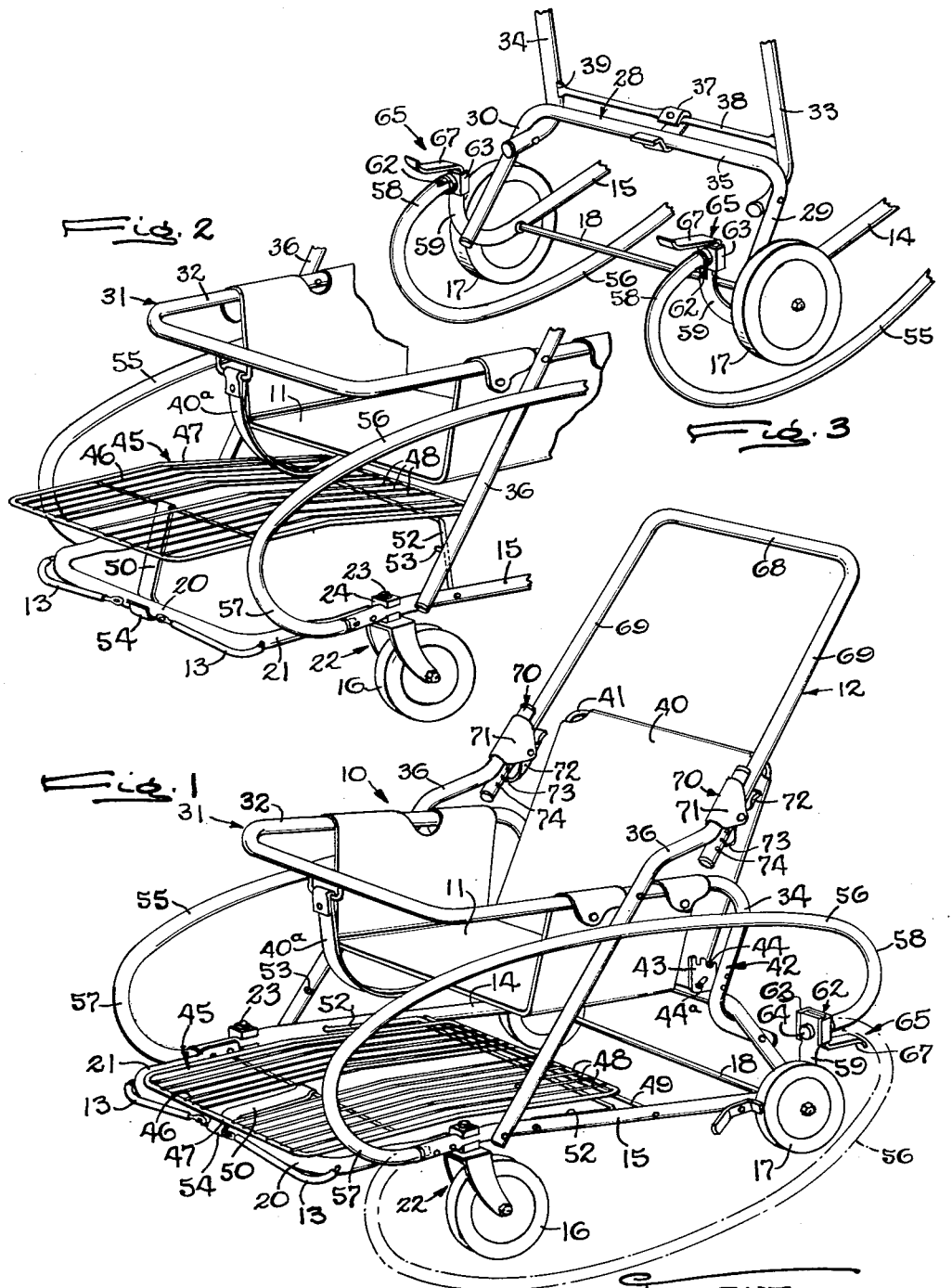
INVENTOR
Charles V. Kenney
by Wolfe, Hubbard, Voit & Osann
ATTORNEYS

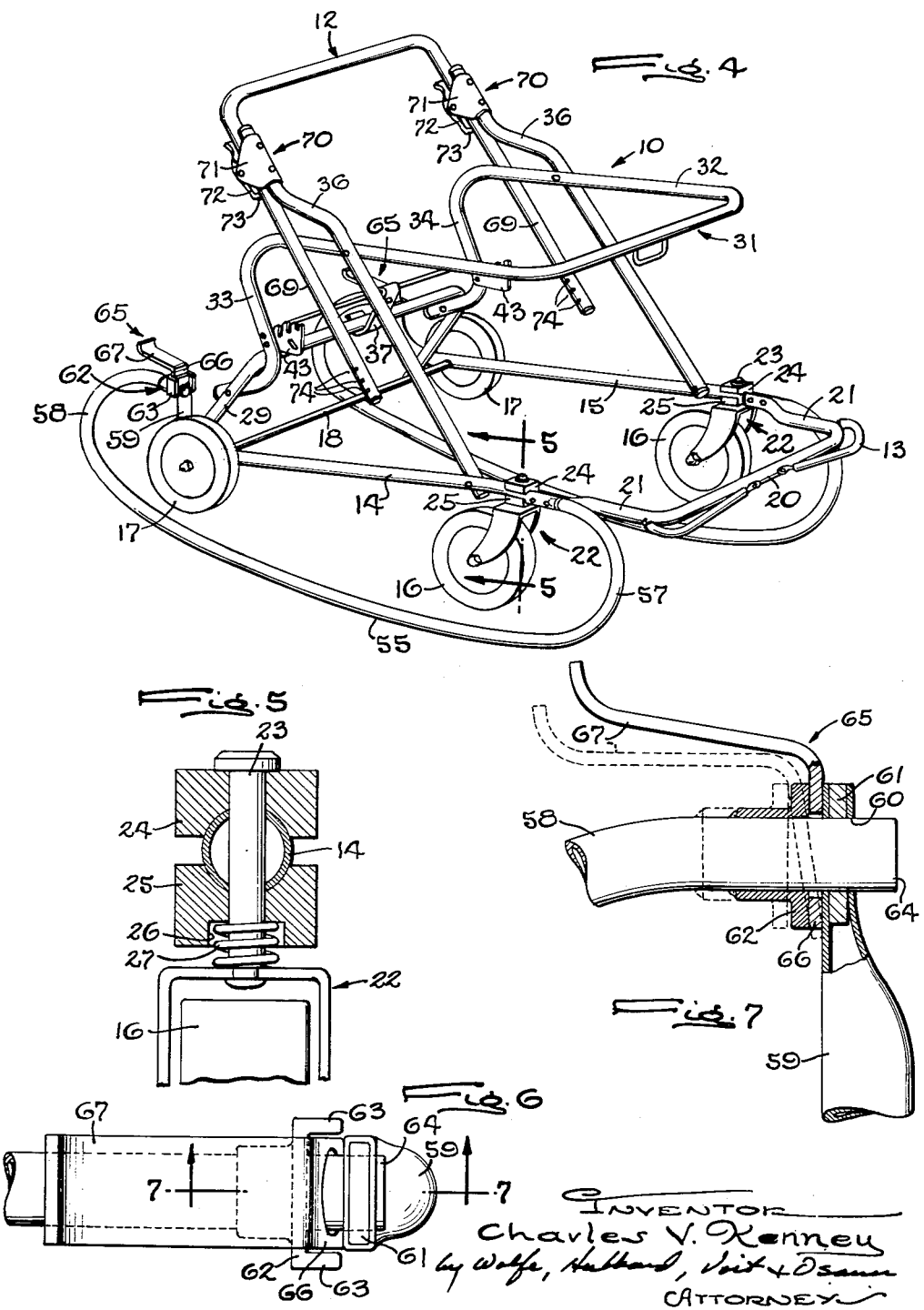

United States Patent Office 3,010,731
Patented Nov. 28, 1961

3,010,731
BABY STROLLER
Charles V. Kenney, Box 248, R.R. 2, Rockford, Ill.
Filed Oct. 14, 1959, Ser. No. 846,455
3 Claims. (Cl. 280—9)

This invention relates to a baby stroller having a seat supported by a frame mounted on wheels to roll along a supporting surface and having a handle extending upwardly therefrom to a convenient height for pushing the stroller.

The general object of the invention is to provide a device of the above character having runners mounted on the frame in a novel manner to turn between a convenient out-of-the-way position and a position below the wheels and supporting the device thereby to support the stroller for sliding along the supporting surface.

Another object is to provide, in a device of the above character, runners having a curved contour to convert the stroller to a baby rocker.

It is a further object to provide runners having a novel latching means operable to selectively hold the runners in either position.

The invention also resides in the provision of a novel means for adjusting the height of the handle and for selectively holding it in the desired position.

Other objects and advantages of the invention will become apparent from the following detailed description taken in connection with the accompanying drawings, in which FIGURE 1 is a perspective view of a baby stroller embodying the novel features of the present invention.

FIG. 2 is a fragmentary perspective view showing the foot rest in the raised position.

FIG. 3 is a fragmentary perspective view showing the back of the stroller and having parts removed.

FIG. 4 is a perspective view of the stroller with parts removed and the handle in the lowered position.

FIG. 5 is a sectional view taken along line 5—5 on FIG. 4.

FIG. 6 is a fragmentary top view of the runner latch.

FIG. 7 is a sectional view taken along line 7—7 on FIG. 6.

For purposes of illustration, the present invention is shown in the drawings embodied in a baby stroller 10 having a seat 11, in which the bady rides, supported by a frame mounted on wheels. A handle 12 projects upwardly from the frame to a convenient height to facilitate walking behind the vehicle and pushing it from place to place. A rubber bumper 13 projects beyond the front end of the stroller to serve as a cushion to reduce damage to furniture and walls resulting from the vehicle being moved against them.

Along each side of the stroller 10 extending longitudinally from front to back are two parallel tubular wheel frame members 14 and 15 having wheels 16 and 17 mounted adjacent their front and back ends. The back wheels 17 are journaled to turn about a fixed horizontal axis on an axle 18 which spans the frame members 14 and 15. The axle 18 projects through the wheel frame members and extends outwardly beyond these members to allow the wheels 17 to be mounted outside of and adjacent to the frame members, the axle, thereby, serving to join the two wheel frame members 14 and 15 and hold them in a spaced relationship defining the width of the stroller 10.

The two wheel frame members 14 and 15 are joined at the front end of the stroller by a tubular cross-member 20 having a generally U-shape and disposed so as to project beyond the end of the wheel frame members with the legs 21 of the U extending back towards the ends of the members 14 and 15. The ends of the legs 21 are flattened and shaped to engage the inside of each of the tubular wheel frames and are fastened thereto thus holding the front ends of the frame members in the desired parallel spaced relationship.

The front wheels 16 of the vehicle comprise casters 22 mounted on the wheel frame members 14 and 15 through the medium of a pivot pin 23 which projects downwardly through the frame members and is fixed to the top of the caster 22 (see FIG. 5). On either side of the wheel frame member 14, so as to be disposed between the head of the pivot pin 23 and the member 14 and between the caster 22 and the member 14, are blocks of bearing material 24 and 25 such as nylon or the like (see FIG. 5). The pivot pin 23 extends through the blocks 24 and 25 which are curved to fit the tubular wheel frame member 14 on the sides adjacent the member. The lower block 25, which is disposed between the bracket and member, has a cavity 26 on the side adjacent the caster 22 to receive a resilient shock-absorbing means 27 which cushions the shocks imparted to the wheel 16 by irregularities in the supporting surface. In the present instance, the shock-absorbing means 27 comprises a spring which is mounted in the cavity 26 to act between the caster 22 and the block 25.

Various tubular frame members are attached to the wheel frame members, described above, to support the seat 11 and the handle 12 of the stroller 10. All of the connections between these members and between the members and the wheel frame are through the medium of pins which permit the various parts to turn relative to each other about these pins so that the stroller may be collapsed to assume a convenient shape whereby it occupies less storage space and may be easily moved. In the following description of these members, the extended or operating position will be described.

At the rear side of the stroller, a U-shaped member 28 is disposed above the rear axle 18 and its legs 29 and 30 project angularly downward toward the rear of the stroller and are pinned to the wheel frame members 14 and 15 at a point behind the axle. This U-shaped member 28 supports a seat frame 31 disposed above the wheel frame members. The seat frame 31 is constructed with a horizontal portion 32 comprising a tube extending along both sides and across the front of the stroller. The free ends 33 and 34 of this member are bent into S-shaped portions which extend downwardly and curve under the bight 35 of the U-shaped member 28. The free ends of the S-shaped portion of the seat frame 31 are pinned to the U-shaped member 28 at a point between the bight portion 35 and the connection to the wheel frame members.

The horizontal portion 32 of the seat frame 31 is held in position by two handle support members 36 projecting angularly upwardly toward the rear end of the stroller 10. The support members 36 are pinned to the wheel frame 14 and 15 at their lower ends and to the seat frame 31 intermediate their ends. The angle at which the members 36 are disposed is such as to place the stroller ahead of the person pushing it thereby allowing clearance for the person to walk.

Having the various members pinned together as described necessitates the provision of a means for holding the device in the erected or serviceable position. In the present instance, this means comprises a resilient clip 37 fixed to a rod 38, mounted on the S-shape portion of the seat frame 31, and operable to resiliently grip the bight portion 35 of the U-shaped member 28 and prevent the device from collapsing (FIG. 3). The rod 38 is mounted by flattening the ends thereof and projecting them into elongated holes 39 formed on the inner side of the tubular S-shape portion of the seat frame 31. The clip 37 is riveted to the center of the rod 38 and curves downwardly around the bight of the U-shape member. To collapse the stroller, the clip is disengaged from the bight and the U-shape member 28 rocked rearwardly about the pins connecting it to the wheel frame members 14 and 15. This movement, in turn, moves the S-shape portion of the seat frame 31 backwardly and downwardly turning the frame members relative to each other about their pivotal connections.

The seat 11 is attached to the horizontal portion 32 of the seat frame 31. A strap 40ᵃ, having one end attached to the frame 31 and the other to the seat 11, extends between the legs of the infant so as to hold him in the vehicle. The back 40 of the seat 11 comprises a covering spanning a rectangular frame 41. The angle of the back relative to the seat is adjustable between a raised position wherein the back extends laterally from the plane of the seat and a reclined position wherein the back extends outwardly in the same horizontal plane as the seat. To this end, a conventional seat-adjusting means 42 is provided. This means 42 consists of members 43 pinned to each S-shaped portion of the seat frame 31, and having a series of fingers which form grooves to receive a rod 44 fixed to the rectangular frame 41 of the seat back and hold it in the various positions. A second rod 44ᵃ, fixed to the frame 41 and spaced apart from the first rod, projects through slots formed in the members. The seat is adjusted by shifting the first rod 44 from groove to groove while the second rod 44ᵃ is retained in the slot.

To provide a support for the infant's legs, a footrest 45 is disposed beneath the seat 11 and mounted on the frame to move between an upper position adjacent the bottom of the seat and a lowered position adjacent the frame. In the present instance, the footrest 45 comprises a platform 46 having a wire frame 47 with a plurality of wires 48 extending longitudinally from front to rear and spaced apart to form a grill-like structure. In the lowered position, one end of the footrest 45 is supported on the U-shaped frame member 20 and the other end is supported by a rod 49 spanning the wheel frames 14 and 15 and fixed thereto. To enable the footrest to be rocked to the raised position, pivotal support members are mounted between the frame and the footrest at each end thereof. At the front of the footrest, this member comprises an arm 50 disposed in the center of the stroller and having one end attached to a cross-member of the footrest and the other end attached to the U-shaped cross-member 20 of the frame. The rear pivotal support member is a U-shaped rod 52 having the legs journaled in the wheel frames 14 and 15 so that the bight portion turns between the raised and lowered positions, about the connection. A stop pin 53 projecting inwardly from the handle support frames 36 engages the U-shaped support member and holds it in the raised position.

In order that the footrest may be removed permitting the infant's legs to extend to the floor, the connection between the arm 50 and the cross-member 20 comprises a clip 54 which resiliently grips the cross-member. By releasing the clip 54 the footrest may be lifted from the frame.

In accordance with the present invention, the stroller is constructed in a novel manner enabling it to be used either as a stroller, a rocker or as a sled. For this purpose, curved runners 55 and 56 are attached on the wheel frame members 14 and 15 and are movable between a raised position and a lowered position. In the raised position the runners are disposed above the wheels 16 and 17 and the stroller is used in the conventional manner. In the lowered position the runners are disposed below the wheels so as to support the stroller. Thus supported on the runners 55 and 56, the stroller may also be used as a sled and slid on the runners over snow and ice. In addition, the curvature of the runners allows the stroller to be rocked back and forth thereon.

In the present embodiment, the runners 55 and 56 comprise bowed tubular members, the ends 57 and 58 of which are curved in a semi-circle so as to project inwardly toward each other. The inwardly projecting ends 57 and 58 of the runners are attached to the ends of the wheel frame so as to turn relative to the wheel frame. The runner 55 is journaled on the wheel frame 14 at the front of the stroller by swaging the end 57 of the runner to form a portion having a reduced cross-section and inserting this portion in the open end of the tubing forming the wheel frame 14.

To facilitate mounting the runner 55 at the back of the stroller, the wheel frame 14 is bent to form an upstanding portion 59 extending laterally upward from the horizontal portion of the frame. The upstanding portion 59 is flattened and has a hole 60 drilled therethrough which the end of the runner projects. To provide rigidity to the upstanding portion of the runner, it is flattened against an insert 61. By forming the runners so that the inwardly projecting ends 64 are spaced apart a distance slightly less than the length of the frame, the ends of the runner can be sprung apart and snapped into place on the frame.

Another feature of the invention is the novel latching means for holding the runner 55 in either the raised or the lowered position and for releasing the runner between the two positions. This means comprises a channel 62 bored to slide over the rear end of the runner with the flanges 63 extending toward this end (FIGS. 6 and 7). The channel 62 is welded to the runner 55 and spaced from the end of the runner to provide an extension 64 to project through the hole in the upstanding flattened portion 59 of the wheel frame with the channel engaging the flattened portion. In this position, the flanges 63 on the channel 62 are disposed on either side of the wheel frame 59 and engage the frame to prevent relative rotation between the two members.

The resilient characteristic of the curved runner 55 is operable to hold the channel 62 in engagement with the flattened upstanding portion 59 of the wheel frame. In order that the runner may be released and moved between the upper and lowered positions, means are provided for forcing the runner outwardly so that the flanges of the channel clear the frame member and permit the runner to turn relative to the frame member. In the present instance, this means comprises an L-shaped lever 65 having one leg 66 disposed between the flattened portion 59 of the wheel frame and the channel 62 and the other leg 67 extended along the runner 55 and spaced apart therefrom to constitute a handle. As the leg forming the handle is moved toward the runner, the channel 62 is pried away from the frame 59 and this permits the runner to pivot relative to the frame on the extension 64 of the runner tube. After moving 180 degrees from one position of the runner to the other, the channel 62 snaps back into position with the flanges 63 on either side of the frame to lock the runner in the new position.

In order that the vehicle may be pushed about from place to place, a U-shaped handle 12 extends upwardly from the frame with the bight 68 disposed above and behind the rear end of the stroller and the legs 69 extending downwardly along the handle support members 36. A feature of the present invention is a novel means for connecting the legs of the handle 12 and the handle support members 36 for permitting the handle to be adjusted to any desirable height. This means comprises a spring loaded catch 70 having a U-shaped bracket 71 riveted to the handle support 36 with the legs projecting toward the handle 12 and extending beyond the handle support 36 (FIGS. 1 and 4).

A lever 72 is disposed adjacent the bracket 71 on the opposite side of the handle 12 and has lugs which straddle the handle and are pinned to the legs of the bracket 71 allowing sufficient clearance for the handle 12 to slide between the lever 72 and the handle support 36. One end of the lever is biased toward the handle by a spring acting between the lever and the handle. To provide a more positive catch to keep the handle 12 from moving relative to the handle support 36, the biased end of the lever is formed with a lip 73 projecting toward the handle and into grooves 74 formed in the handle in the side facing the lever. Pressure exerted on the side of the lever opposite the lip 73 pivots the lever about the pins thereby releasing the handle to slide relative to the frame. It will be apparent that the handle may be moved downwardly along the handle support to where the bight position of the handle engages the catch whereby less storage space will be required for the collapsed stroller (FIG. 4).

I claim as my invention:

1. A baby stroller, having, in combination, a frame having side members parallel and spaced apart, a plurality of wheels journaled on said members to turn about a horizontal axis and roll along a supporting surface, upstanding portions formed on one end of said side members and spaced a predetermined distance from the other end, C-shaped runners having ends spaced apart a distance less than said predetermined distance and operable to spring outwardly to engage the ends of said side members, said runners being journaled on said upstanding portions and the ends of said side members to turn between a raised position wherein said runners are disposed above said wheels and a lowered position wherein the runners extend below the wheels, a channel mounted on said runners adjacent said upstanding portion to abut the portion and having flanges disposed on either side of the portion to prevent turning of said runner relative to said side member, and a lever disposed between said channel and said portion and operable to move the channel and the portion apart thereby permitting the runner to be turned.

2. A baby stroller having, in combination, a frame having parallel and spaced apart side members, a plurality of wheels journaled on said members to turn about a horizontal axis and roll along a supporting surface, runners journaled on said members to turn between a raised position wherein the runners are disposed above said wheels and a lowered position wherein the runners extend below the wheels, an upstanding extension fixed to each of said side members adjacent one end thereof, a part fixed to each of said runners adjacent said extension, the corresponding part abutting said extension and having flanges projecting along either side of the extension to engage the latter thereby to prevent movement of said runner relative to the corresponding side member and means coacting with said part and said extension and selectively operable to move the two apart whereby said runner may be turned between said raised and lowered positions.

3. A baby stroller having, in combination, a frame having parallel spaced side members, a plurality of wheels journaled on said members to turn about a horizontal axis and roll along a supporting surface, curved runners journaled on said side members to turn between a raised position wherein the runners are disposed above said wheels and a lowered position wherein the runners extend below the wheels, an upwardly extending handle support member attached to said frame, a bracket fixed to said support member and having generally horizontal legs straddling the member, a lever pivotally connected to said legs and disposed opposite said bracket and spaced apart from said support member, a lip formed on one end of said lever to project toward said support member, a handle disposed above said support member and having a leg extending donwardly through the legs of said bracket and between said lever and the support member whereby the handle can move up and down along the member to adjust the height of the handle, the leg of said handle having a plurality of grooves spaced therealong, and yieldable means urging said one end of said lever into engagement with said handle with said lip disposed in one of said grooves whereby said handle may be adjusted endwise to and held in similar positions relative to the supporting position in both positions of said runners.

References Cited in the file of this patent

UNITED STATES PATENTS

| | | |
|---|---|---|
| 968,763 | Goldstein | Aug. 30, 1910 |
| 1,164,228 | Seufer | Dec. 14, 1915 |
| 1,958,312 | Potts et al. | May 8, 1934 |
| 2,129,316 | Cramer et al. | Sept. 6, 1938 |
| 2,293,560 | Price | Aug. 18, 1942 |
| 2,497,440 | Denny | Feb. 14, 1950 |
| 2,551,009 | Kaltenbach | May 1, 1951 |
| 2,693,366 | Randolph | Nov. 2, 1954 |
| 2,886,337 | Quisenberry | May 12, 1959 |